(12) United States Patent
Brun et al.

(10) Patent No.: US 10,041,566 B2
(45) Date of Patent: Aug. 7, 2018

(54) GEARING ARRANGEMENT FOR A VERTICAL MILL

(71) Applicant: SIEMENS AKTIENGESELLSCHAFT, München (DE)

(72) Inventors: Steffen Brun, Borken (DE); Ali Kemal Kücükyavuz, Herne (DE); Franz Schmeink, Bocholt (DE)

(73) Assignee: Siemens Aktiengesellschaft, München (DE)

( * ) Notice: Subject to any disclaimer, the term of this patent is extended or adjusted under 35 U.S.C. 154(b) by 248 days.

(21) Appl. No.: 15/019,584

(22) Filed: Feb. 9, 2016

(65) Prior Publication Data

US 2016/0230842 A1    Aug. 11, 2016

(30) Foreign Application Priority Data

Feb. 10, 2015    (EP) .................................... 15154429

(51) Int. Cl.
| | |
|---|---|
| *F16H 37/04* | (2006.01) |
| *F16H 1/20* | (2006.01) |
| *B02C 15/00* | (2006.01) |

(52) U.S. Cl.
CPC ........... *F16H 1/203* (2013.01); *B02C 15/006* (2013.01); *F16H 1/20* (2013.01); *F16H 37/041* (2013.01)

(58) Field of Classification Search
None
See application file for complete search history.

(56) References Cited

U.S. PATENT DOCUMENTS

| | | | | |
|---|---|---|---|---|
| 4,210,291 A | * | 7/1980 | Kienast ................. | B02C 15/006 241/110 |
| 4,887,489 A | * | 12/1989 | Sigg ...................... | B02C 15/006 475/343 |
| 5,616,098 A | * | 4/1997 | Katayama ............. | B02C 15/006 384/308 |

(Continued)

FOREIGN PATENT DOCUMENTS

| | | |
|---|---|---|
| CN | 87216030 U | 10/1988 |
| CN | 101248290 A | 8/2008 |

(Continued)

OTHER PUBLICATIONS

Grote, K.-H.; Feldhusen, J. (Hrsg.), Dubbel—Taschenbuch für den Maschinenbau, Springer-Verlag Berlin Heidelberg, vol. 23, 2011, ISBN 978-2-642-17305-9, p. F17; 2011.

*Primary Examiner* — Justin Holmes
(74) *Attorney, Agent, or Firm* — Henry M. Feiereisen LLC

(57) ABSTRACT

A gearing arrangement for a vertical mill includes a central shaft mounted for rotation about a vertical rotation axis, a spur gear arranged in fixed rotative engagement on the central shaft, and an output flange rotatably coupled to the central shaft. At least one gear unit having gear pairs is arranged vertically below the output flange, with a pinion gear arranged on an output side of the gear unit for engagement into the spur gear on the central shaft. The gear unit is arranged on a traversing mechanism in such a way that the pinion gear on the output side is movable in relation to the spur gear to engage in and disengage from the spur gear, as the gear unit is moved by the traversing mechanism.

12 Claims, 4 Drawing Sheets

(56) References Cited

U.S. PATENT DOCUMENTS

| | | | | |
|---|---|---|---|---|
| 6,368,244 B1* | 4/2002 | Hosle | ............... | B02C 15/006 241/110 |
| 7,926,754 B2* | 4/2011 | Hoffmann | ............ | B02C 15/006 241/117 |
| 8,172,168 B2* | 5/2012 | Hoffmann | ............... | B02C 15/00 241/121 |
| 2008/0220925 A1 | 9/2008 | Schwingshandl | | |
| 2009/0261190 A1 | 10/2009 | Hoffmann | | |
| 2016/0121336 A1 | 5/2016 | Yalin et al. | | |

FOREIGN PATENT DOCUMENTS

| | | |
|---|---|---|
| CN | 101357347 A | 2/2009 |
| CN | 101878380 A | 11/2010 |
| CN | 202833872 U | 3/2013 |
| DE | 9111017 U1 | 10/1991 |
| DE | 4227512 C1 | 3/1994 |
| DE | 102005030145 A1 | 1/2007 |
| EP | 2 025 409 | 8/2009 |
| EP | 2 295 147 | 3/2011 |
| EP | 2511010 | 10/2012 |
| JP | 2010284629 A | 12/2010 |
| JP | 5345004 B2 | 11/2013 |
| WO | WO 2008/049545 A1 | 5/2008 |
| WO | WO 2008/0459545 | 5/2008 |
| WO | WO 2009068484 A1 | 6/2009 |
| WO | WO 2015/003716 A1 | 1/2015 |

* cited by examiner

GEARING ARRANGEMENT FOR A VERTICAL MILL

CROSS-REFERENCES TO RELATED APPLICATIONS

This application claims the priority of European Patent Application, Serial No. 15154429.3, filed Feb. 10, 2015, pursuant to 35 U.S.C. 119(a)-(d), the disclosure of which is incorporated herein by reference in its entirety as if fully set forth herein.

BACKGROUND OF THE INVENTION

The present invention relates to a gearing arrangement for a vertical mill.

The following discussion of related art is provided to assist the reader in understanding the advantages of the invention, and is not to be construed as an admission that this related art is prior art to this invention.

Vertical mills are used in the building materials industry for the purpose of breaking up limestone, clinker, slag, chalk, gypsum and coal, and in the processing of coal.

FIG. 1 shows a side and partial sectional view of a conventional vertical mill 20 having a mill housing 22 which forms a milling space 29 with a rotatable milling plate 23, onto which material to be milled are fed from above. Milling rollers 24 which roll on the milling plate 23 comminute the material on the milling plate 23. For feeding the material and airflows into the milling space 29, the mill housing 22 has openings in its upper part, which can be closed off by covers 28, 30. The mill housing 22 is carried by a support structure 26, which in turn is supported on a mill foundation 18, which creates space beneath the milling space 29 for a drive device 10 for operating the milling plate 23. The drive device 10 is also supported by the mill foundation 18 and includes a drive motor 12, a gearing arrangement 1, and a coupling 14, which connects an output shaft from the drive motor 12 to an input shaft on the gearing arrangement 1. The coupling 14 can be a hydrodynamic coupling, a high-flexibility coupling, or the like.

The gearing arrangement 1 is a beveled gear planetary gearing, which has on its input side a beveled gear stage which turns the rotation axis by 90 degrees, and at least one planetary gearing stage downstream from the beveled gear stage on the output side. Beveled gear planetary gearings of this type are commercially available from Siemens AG under the designation KMP and KMPS. An output flange 16 of the gearing arrangement 1 transmits the rotation of the planetary gearing stage on the output side to the milling plate 23. The output flange 16 is connected to the milling plate 23 using a sub-construction 17, which is in the form of a truncated cone which tapers in the downward direction.

U.S. Pat. No. 7,926,754 describes an actively redundant drive system for roller mills. Continuous availability of at least two drives is assured by the arrangement of more than two drives, wherein the at least two drives supply the necessary milling power for the roller mill. Each of the drives has a pinion gear which meshes with a crown gear arranged underneath the milling plate. Each drive module incorporates an electric motor, a coupling and a beveled/spur gear drive, arranged on a base frame as the transport unit. If one drive fails, this drive can be withdrawn on a carriage from its toothed engagement, without interrupting the milling process.

To compensate angular deviations between the axes of the pinion gears and the crown gear as a result of operating conditions, the pinion gears must be mounted so that they can move in a tilting direction. Sealing the oil lubrication of the toothed engagement between the pinion gear and the crown gear is complex and thus possible only at considerable cost.

EP 2025409 A1 describes a mill drive for roller mills with a beveled gear stage for feeding in the power and at least one planetary gearing stage for the power output on the milling bowl side. Instead of a single large drive, the beveled gear stage has several separate drives and corresponding beveled pinion gears, which are arranged to engage jointly with the beveled gear. A beveled gear stage with several separate drives, such as is described in EP 2025409 A1, requires adjustment in order to achieve a satisfactory bearing pattern between the flanks of the teeth on the beveled gear and on the beveled pinion gears which mesh with them. This adjustment is generally, effected by an axial displacement of the shafts involved. Adjusting the beveled gear shaft for all beveled pinion gears which engage with it requires a compromise, which does not result in optimal bearing patterns for all the beveled pinion gears, and hence results in restrictions in the performance of the beveled gear stage. Consequently, for the purpose of balancing them out, the components must be appropriately oversized. This is expensive.

It would therefore be desirable and advantageous to provide an improved transmission for a vertical mill to obviate prior art shortcomings.

SUMMARY OF THE INVENTION

According to one aspect of the present invention, a gearing arrangement for a vertical mill includes a central shaft mounted for rotation about a vertical rotation axis, a spur gear arranged in fixed rotative engagement on the central shaft, an output flange rotatably coupled to the central shaft, at least one gear unit having gear pairs arranged vertically below the output flange, a pinion gear arranged on an output side of the gear unit for engagement into the spur gear on the central shaft, and a traversing mechanism, the gear unit being arranged on the traversing mechanism in such a way that the pinion gear on the output side is movable in relation to the spur gear to engage with and disengage from the spur gear, as the gear unit is moved by the traversing mechanism.

A gearing arrangement is suitable for driving a vertical mill. In a vertical mill, material to be milled, which is fed onto a milling plate, is generally acted upon by mill rollers and thereby milled. The gearing arrangement has a central shaft which can rotate about a vertical rotation axis. The central shaft is coupled to an output flange of the gearing arrangement. In a vertical mill, a mill plate which is connected to the output flange can thus also be caused to rotate. The output flange can also be referred to as a "gearing flange" of the gearing arrangement. Arranged on the central shaft so that they rotate together is a spur gear, so that a drive which acts on the spur gear causes the central shaft, and hence also the milling plate, to rotate. The gearing arrangement for driving the vertical mill has one or more gear units, each of which having pairs of gears. The gear pairs for each gear unit have on the output side, i.e. on a gearing side facing the central shaft, a pinion gear for engagement with the spur gear on the central shaft. Two gears which engage with each other form a gear pair. This can produce a change of the gearing ratio. Each of the gear units has at least one gear pair. The pinion gear on the output side, which engages with the spur gear on the central shaft, is hereby also considered as gear pair of the gear unit. All gear pairs of each gear unit are arranged vertically below the output flange. The gear pairs may hereby be arranged within a, preferably cylindrical, circumferential surface, i.e. on the side facing the central shaft, which describes the external perimeter of the output flange projected vertically downward about the central shaft. This circumferential surface separates a region, in which the output flange applies a torque, from the surroundings, and can be succinctly described by the term "line of action". Each gear unit is arranged on a traversing mechanism in such a way that the pinion gear on the output side can be engaged with and disengaged from the central spur gear, as the gear unit is moved by the traversing mechanism.

The inventive solution is based on the idea of creating a distributed-power drive system for a vertical mill which combines the advantages of the proven beveled gear planetary drive with those of the modular multiple drives. The use of modular insert gear units, so-called "plug-in" units, permits exchange of individual gear units without the need to retract the complete gearing beneath the mill plate.

The gear pairs of the gear units are situated within the output line of action. As a result, a compact drive unit is produced with a small installed volume. Apart from this, sealing the gearing against oil leakage is, compared to a crown gear solution with oil-tight sheet metal hood, simpler to implement, e.g. by a shaft sealing ring and/or a contactless labyrinth seal on the input shafts of the gear units.

A gearing arrangement according to the present invention is cost-effective and more compact, when compared to a conventional beveled gear planetary gearing. Radial impacts caused during the milling process can be absorbed, like in a conventional beveled gear planetary gearing, by the (main stage) planet gear carrier via a bearing. The result of this is that a pinion gear which can tilt, such as in a crown gear solution, is not necessary.

The invention realizes an increase in performance on the basis of proven gear concepts of the conventional beveled gear planetary gearing. The modularity of the gearing arrangement leads to improved serviceability from insert gearings in the form of a "plug-in" solution, so that the need for alignment works is eliminated, or at least greatly reduced. In addition, the gearing ratio can be changed subsequently. The "plug-in" units can be simply integrated into the oil circulation schema for the gearing, without additional connections and without separate oil aggregates. For example, an oil tank can be integrated into the gearing arrangement.

Compared to a conventional beveled gear planetary gearing in the field of vertical mills, the present invention results in a reduced installed height. Still, the present invention is compatible with conventional beveled gear planetary gearing solutions. For example, the proven layout and configuration of the axial bearing of the central shaft can be carried over from the conventional beveled gear planetary gearing in the field of vertical mills, and the main stage can be constructed in the usual way.

For maintenance activities too, the invention has benefits: there is a clearly defined interface between the gear unit and a respective motor drive.

As drive motor, use can be made of a fixed speed drive or a variable speed drive, e.g. a conventional motor such as a slipring motor, asynchronous motor, or permanent magnet synchronous motor. The motor, and optionally also a frequency converter, can be arranged on a movable arm and/or be connected to the gear unit via a lantern.

According to another advantageous feature of the present invention, a planetary gearing having at least one planetary gearing stage can be provided to couple the central shaft to the output flange, for power output on the milling side.

According to another advantageous feature of the present invention, the central shaft can be rotatably coupled by a planetary gearing, including at least one planetary gearing stage. It is hereby of advantage that the overall gear reduction required for the vertical mill is effected partly by the movable gear units and partly by the downstream planetary stage. Thus, the gear units can be built more compact.

According to another advantageous feature of the present invention, the gear unit can be constructed in the form of a beveled/spur gear unit having, on an input side, a beveled gear stage, a beveled pinion gear shaft operably connected to the beveled gear stage and connectable to a motor, and at least one spur gear stage downstream from the beveled gear stage. For example, downstream from the beveled gear stage, there can be one to three spur gear stages, with helical or straight toothing. The gears of the gear pairs mesh with one another and form gearing stages.

It is also possible that the "plug-in" units are constructed without beveled gear stage, i.e. exclusively using spur gear stages, with the motor axis of the drive motor extending vertically. The advantage here is that those spur gear stages can be used that are easier to manufacture.

According to another advantageous feature of the present invention, the beveled pinion gear shaft can define a horizontal rotation axis. As a result, the use of standard beveled gear stages is possible, which are optimized in respect of the contact pattern arrangement and contact pattern adjustment, and have relatively short delivery times.

According to another advantageous feature of the present invention, the gearing arrangement can have has at least two separate gear units. The advantage here is that the active redundancy achieved by distribution of the power results in better security. According to Grote, K.-H.; Feldhusen, J. (editor), Dubbel-Taschenbuch für den Maschinenbau [Handbook of Mechanical Engineering], Springer-Verlag Berlin Heidelberg, 23. Edition, 2011, ISBN 978-2-642-17305-9, page F17, the following distinction is to be made: in the case of active redundancy, all the system elements are active participants in the task; in the case of passive redundancy, some system elements are held in reserve, and their activation requires a switching operation.

According to another advantageous feature of the present invention, the at least two gear units can be arranged in symmetric spaced-apart relationship about the spur gear with. In this way, stress on the bearing of the central shaft to support the spur gear is relatively small.

According to another advantageous feature of the present invention, the at least two gear units can be arranged in asymmetric spaced-apart relationship about the spur gear. As a result, constructional features of an existing mill design can be taken into account.

According to another advantageous feature of the present invention, a gear housing can be provided to accommodate the gear unit and can have on an input side an opening for passage of an input shaft such that an annular gap is defined between the gear housing and the input shaft, and a seal can be provided to seal the annular gap against leakage of oil. The seal may be a shaft sealing ring or a labyrinth seal. Compared to a crown gear solution with an oil-tight sheet metal hood, such an oil seal is much easier to implement by a shaft seal on the input shaft. The input shaft of the gear unit can advantageously be a beveled pinion gear shaft.

According to another advantageous feature of the present invention, roller or friction bearings can be provided to support rotating components of the gear unit. Depending on the application at hand, i.e. bearings for a fast or slow running shaft, roller or friction bearing offer advantages.

According to another aspect of the present invention, a drive device for a vertical mill, includes a drive motor, and a gear arrangement connected to the drive motor and including a central shaft mounted for rotation about a vertical rotation axis, a spur gear arranged in fixed rotative engagement on the central shaft, an output flange rotatably coupled to the central shaft, at least one gear unit having gear pairs arranged vertically below the output flange, a pinion gear arranged on an output side of the gear unit for engagement into the spur gear on the central shaft, and a traversing mechanism, the gear unit being arranged on the traversing mechanism in such a way that the pinion gear on the output side is movable in relation to the spur gear to engage with and disengage from the spur gear, as the gear unit is moved by the traversing mechanism.

According to another advantageous feature of the present invention, the drive motor can be connected directly to an input shaft of the gear unit in the absence of a coupling there between. A direct linkage, i.e. a connection with coupling, has advantages in terms of the regulation and control of a drive train.

According to yet another aspect of the present invention, a vertical mill includes a drive device, as set forth above.

Also in accordance with the invention is the use in a vertical mill of a gearing arrangement as described above or a drive device as described above.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
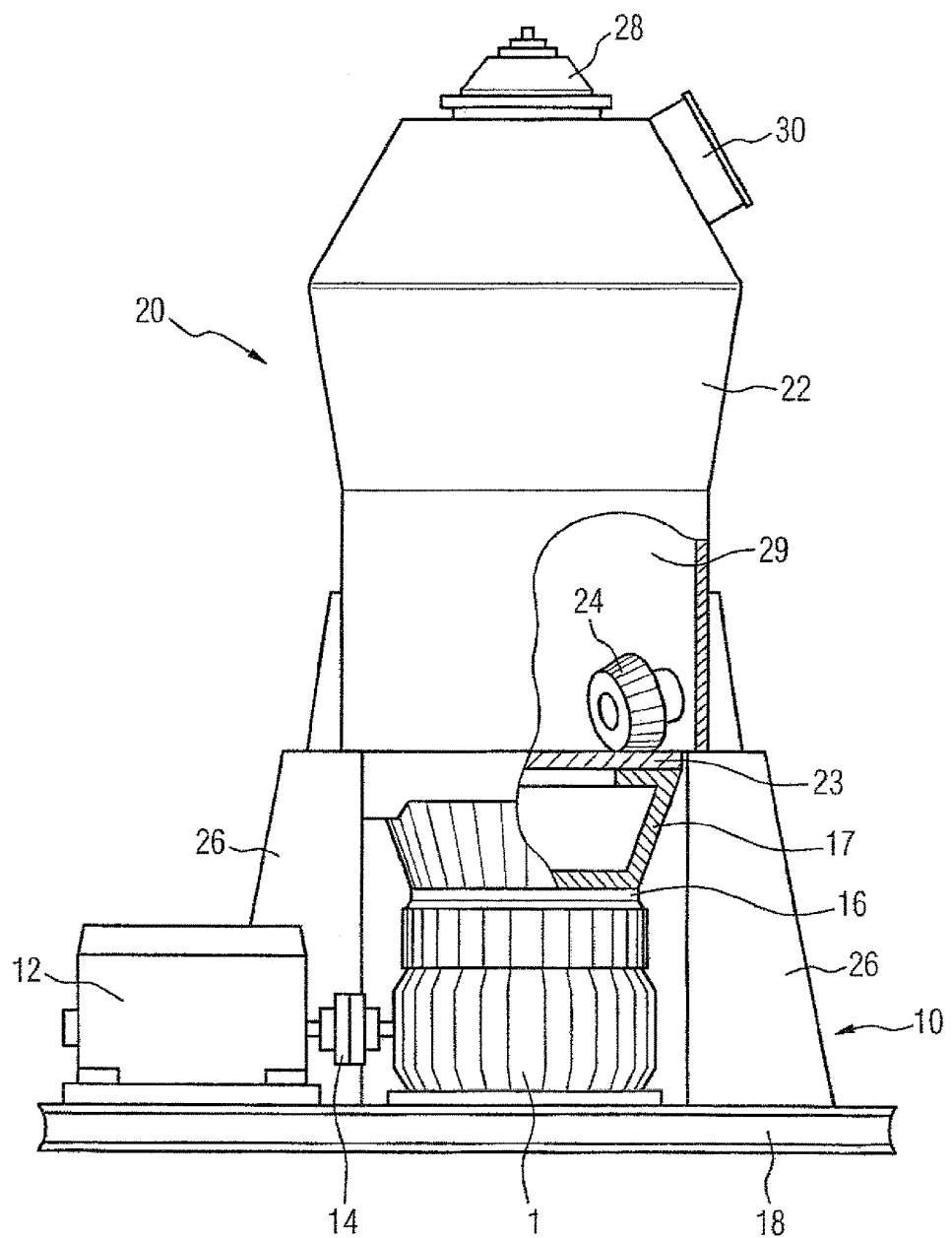
FIG. 1 is a schematic side view of a conventional vertical mill.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 2:
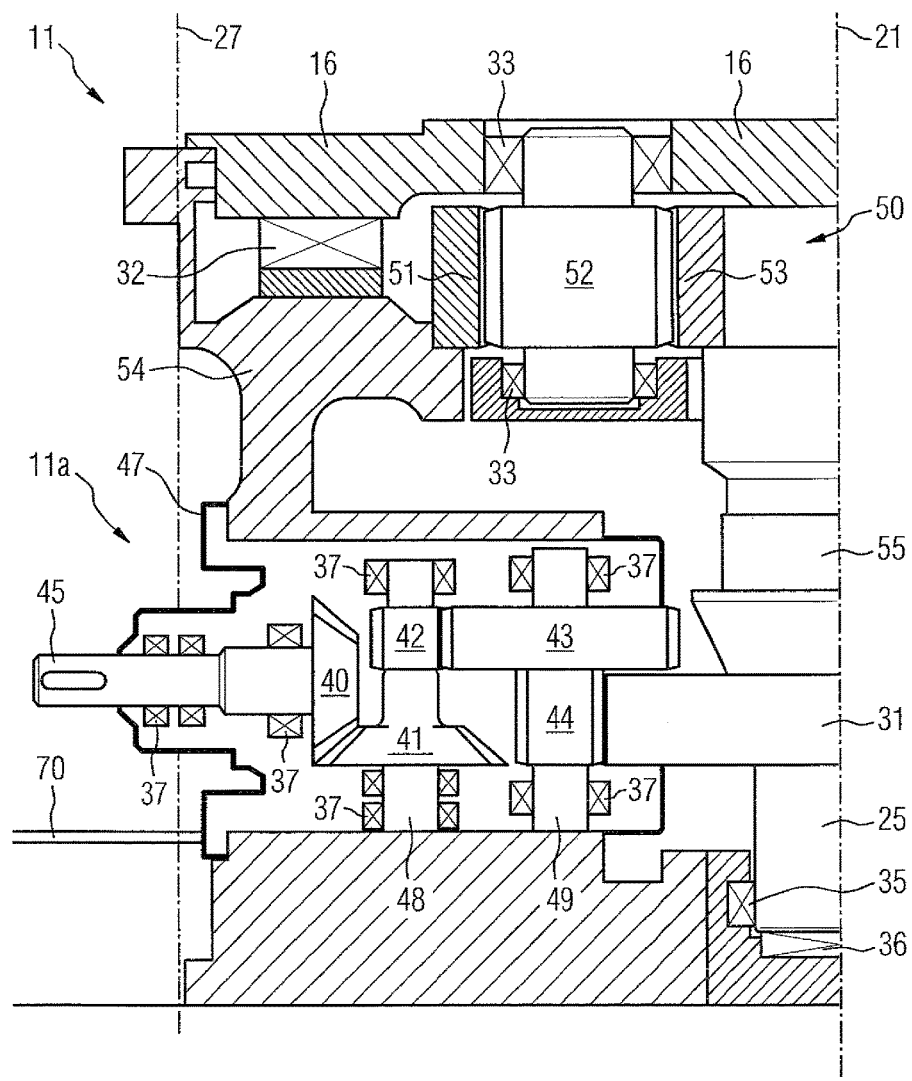
FIG. 2 is a sectional view of a gearing arrangement according to the present invention with illustration of one gear unit.

Turning now to the drawing, and in particular to FIG. 2, there is shown a sectional view of the left-hand half of a gearing arrangement according to the present invention, generally designated by reference numeral 11 for driving a vertical mill. For convenience and sake of simplicity, the following description is made only in relation to the left-hand side of the gearing arrangement 11 as the right-hand side is merely a mirror image thereof. The gearing arrangement 11 includes, on the input or drive side, a shiftable gear unit 11 a and on the output side a planetary gearing 50.

The planetary gearing 50 has a vertical shaft position. The planetary gearing 50, constructed as a single stage, includes a ring gear 51, a planet carrier, planetary gears 52 supported by the planet carrier, and a sun wheel 53. The sun wheel 53 is connected to a central shaft 25 which extends vertically through the gearing arrangement 11 and can rotate about a vertical rotation axis 21. The ring gear 51 of the planetary stage is firmly connected to a gear housing 54. The planet carrier of the planetary stage is connected to an output flange 16 or is constructed in one piece with the output flange 16, and is supported by an axial bearing 32.

The central shaft 25 is supported by a radial bearing 35 arranged in a lubricant well and by an axial bearing 36. The central shaft 25 and the sun wheel 53 of the planetary stage are connected by a coupling 55. The planetary gearing 50 can also have a two-stage construction, in which case the planet carrier on the drive side of the planetary stage, and the sun wheel on the output side of the planetary stage, are connected to one another in fixed rotative engagement. Structure of two-stage planetary gearings of this type are known in the art, for example from EP 2 295 147 B1.

The gear unit 11 a disposed anteriorly of the planetary gearing 50 forms a modular plug-in gear unit. Its modularity makes it possible to replace individual gear units, without the need to remove the entire gearing beneath the mill.

The gear unit 11a includes several gear pairs 40 to 44 which are accommodated in the gear housing 47 and mounted in bearings 37. The gear pairs 40 to 44 of the gear unit 11a are arranged vertically beneath the output flange 16. The gear pairs 40 to 44 are hereby arranged within a circumferential surface 27, i.e. on the side facing towards the central shaft 25, which describes the external perimeter of the output flange 16 projected vertically downwards around the vertical mill. The circumferential surface 27 separates from the surroundings a region in which the milling torque is provided at the output flange 16, and can be succinctly described by the term "line of action".

Figure 3:
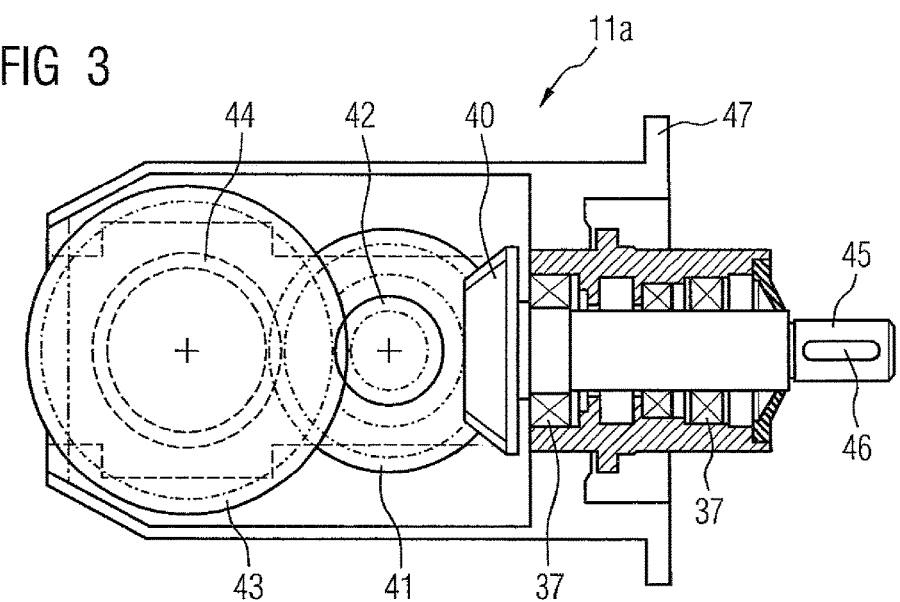
FIG. 3 is a plan view of a gear unit of the gearing arrangement.

The gear unit 11a includes a beveled pinion gear shaft 45, which is arranged horizontally and is rotatably supported by bearings 37 in the gear housing 47 of the gear unit 11a, and a beveled pinion gear 40 arranged in fixed rotative engagement on the mill-side end of the beveled pinion gear shaft 45. The beveled pinion gear 40 meshes with a beveled gear 41 which is arranged in fixed rotative engagement on a first vertical shaft 48 which is rotatably supported by bearings 37 in the gear housing 47 of the gear unit 11a. A spur gear pinion 42, which is also arranged in fixed rotative engagement on the first vertical shaft 48, meshes in turn with a spur gear 43 which is arranged in fixed rotative engagement on a second vertical shaft 49 rotatably supported by bearings 37 in the gear housing 47 of the gear unit 11a. A spur gear pinion 44 on the output side, which is also arranged in fixed rotative engagement on the second vertical shaft 49, meshes with a spur gear 31, which is arranged in fixed rotative engagement on the central shaft 25. The sequence of the gears 40 to 44 in a gear unit 11 a is readily apparent in the plan view of the gear unit 11a, shown vertically from above in FIG. 3.

Thus, on the output side, the gear unit 11 a has a pinion gear 44 which is provided for engaging the spur gear 31 on the central shaft 25. The gear unit 11 a is arranged on a traversing mechanism 70 in such a way that the pinion gear 44 on the output side can be engaged with and disengaged from the central spur gear 31, when the gear unit 11 a is moved the traversing mechanism 70 correspondingly. The traversing mechanism 70 has rails on which a carriage, arranged on the underside of the gear housing 47 of the gear unit 11a, can slide.

The drive for the vertical mill is provided by one or more drive motors, advantageously electric motors. For this purpose, the gear unit 11a is driven by a drive motor by connecting an output shaft of the drive motor to the beveled pinion gear shaft 45 of the gear unit 11a, e.g. with the aid of a feather key joint 46.

Figure 4:
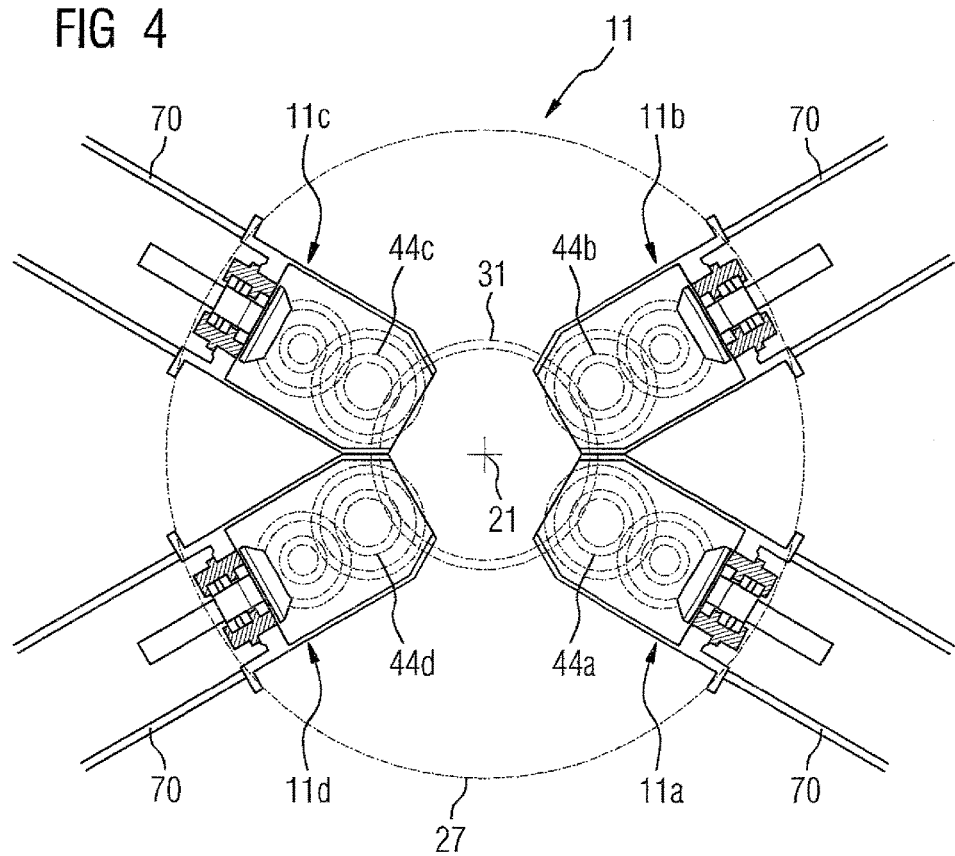
FIG. 4 is a plan view of a gearing arrangement with four gear units.

FIG. 4 is a schematic plan view of four gear units 11a to 11d, arranged symmetrically about the central shaft of a vertical mill, which are engaged simultaneously with the spur gear 31 arranged on the central shaft. For inspection or maintenance purposes, individual gear units 11a to 11d together with their connected motor can be withdrawn from the drive, so that the respective pinion gear 44a on the output side is disengaged from the spur gear 31 on the central shaft. For the purpose of removing a gear unit 11a to 11d from the drive train, use is made of a traversing mechanism 70 having rails. Because the gearing, motor, coupling and oil supply system are arranged on a carriage, there is no problem in exchanging a gear unit 11a to 11d for inspection purposes.

When the drive device of the vertical mill has two or more gear units and separate drive motors, respectively, i.e. two or more drive modules, the redundancy provided in this way permits operation of the mill 20 also with a reduced number of drives. Also, in the event of failure of a drive module, comprised of gear unit and connected drive motor, this drive module can be pulled on a carriage out of its toothed engagement without interrupting the milling operation.

Figure 5:
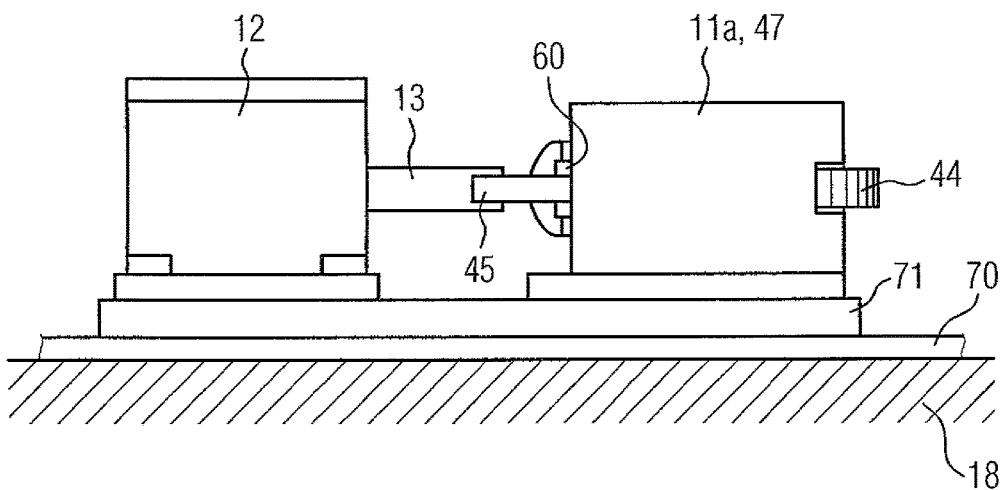
FIG. 5 is a side view of a drive device.

FIG. 5 shows a side view of a drive device in accordance with the invention, including a gear unit 11a and an electric motor 12. The gear unit 11a and the electric motor 12 are both mounted on a carriage 71, which can move on rails of the traversing mechanism 70 upon a foundation 18, so that a pinion gear 44 of the gear unit 11a on the output side can be engaged with and disengaged from a spur gear on a central shaft of the vertical mill. A motor shaft 13 and a beveled pinion gear shaft 45 of the gear unit 11a are connected to one another in fixed rotative engagement by a feather key, or by a rotationally elastic coupling.

The gear housing 47 of the gear unit 11a has on the input side an opening for passage of an input shaft 45 of the gear unit 11a. To effect an oil seal for the annular gap between the gear housing 47 and the input shaft 45, a seal 60, in particular a shaft sealing ring and/or a labyrinth seal, is arranged around the input shaft 45.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A gearing arrangement for a vertical mill, comprising:
    a central shaft mounted for rotation about a vertical rotation axis;
    a spur gear arranged in fixed rotative engagement on the central shaft;
    an output flange rotatably coupled to the central shaft;
    gear units having gear pairs arranged vertically below the output flange;
    a pinion gear arranged on an output side of the gear units for engagement into the spur gear on the central shaft;
    a traversing mechanism, said gear units being arranged on the traversing mechanism in such a way that the pinion gear on the output side is movable in relation to the spur gear to, engage in and disengage from the spur gear, as the gear units are moved by the traversing mechanism; and
    a planetary gearing having at least one planetary gearing stage configured to couple the central shaft to the output flange, for effecting an overall gear reduction required for the vertical mill partly by the gear units and partly by the planetary gearing stage.

2. The gearing arrangement of claim 1, wherein the gear units are constructed in the form of beveled/spur gear units having, on an input side, a beveled gear stage, a beveled pinion gear shaft operably connected to the beveled gear stage and connectable to a motor, and at least one spur gear stage downstream from the beveled gear stage.

3. The gearing arrangement of claim 2, wherein the beveled pinion gear shaft defines a horizontal rotation axis.

4. The gearing arrangement of claim 1, wherein the gear units are arranged in symmetric spaced-apart relationship about the spur gear.

5. The gearing arrangement of claim 1, wherein the gear units are arranged in asymmetric spaced-apart relationship about the spur gear.

6. The gearing arrangement of claim 1, further comprising a gear housing accommodating the gear units and having on an input side an opening for passage of an input shaft such that an annular gap is defined between the gear housing and the input shaft, and a seal to seal the annular gap against leakage of oil.

7. The gearing arrangement of claim 6, wherein the seal is a shaft sealing ring or a labyrinth seal.

8. The gearing arrangement of claim 1, further comprising roller or friction bearings configured to support rotating components of the gear units.

9. A drive device for a vertical mill, comprising:
    a drive motor; and
    a gear arrangement connected to the drive motor, said gear arrangement including a central shaft mounted for rotation about a vertical rotation axis, a spur gear arranged in fixed rotative engagement on the central shaft, an output flange rotatably coupled to the central shaft, gear units having gear pairs arranged vertically below the output flange, a pinion gear arranged on an output side of the gear units for engagement into the spur gear on the central shaft, a traversing mechanism, said gear units being arranged on the traversing mechanism in such a way that the pinion gear on the output side is movable in relation to the spur gear to engage in and disengage from the spur gear, as the gear units are moved by the traversing mechanism, and a planetary gearing having at least one planetary gearing stage configured to couple the central shaft to the output flange, for effecting an overall gear reduction required for the vertical mill partly by the gear units and partly by the planetary gearing stage.

10. The drive device of claim 8, wherein the drive motor is connected directly to an input shaft of the gear units in the absence of a coupling there between.

11. A vertical mill, comprising a drive device including a drive motor, and a gear arrangement connected to the drive motor, said gear arrangement including a central shaft mounted for rotation about a vertical rotation axis, a spur gear arranged in fixed rotative engagement on the central shaft an output flange rotatably coupled to the central shaft, gear units having gear pairs arranged vertically below the output flange, a pinion gear arranged on an output side of the gear units for engagement into the spur gear on the central shaft, and a traversing mechanism, said gear units being arranged on the traversing mechanism in such a way that the pinion gear on the output side is movable in relation to the spur gear to engage in and disengage from the spur gear, as the gear units are moved by the traversing mechanism, and a planetary gearing having at least one planetary gearing stage configured to couple the central shaft to the output flange, for effecting an overall gear reduction required for the vertical mill partly by the gear units and partly by the planetary gearing stage.

12. The vertical mill of claim 11, wherein the drive motor is connected directly to an input shaft of the gear units in the absence of a coupling there between.

* * * * *